(No Model.)
H. W. DENNIS.
CAR COUPLING.
No. 497,637.   Patented May 16, 1893.
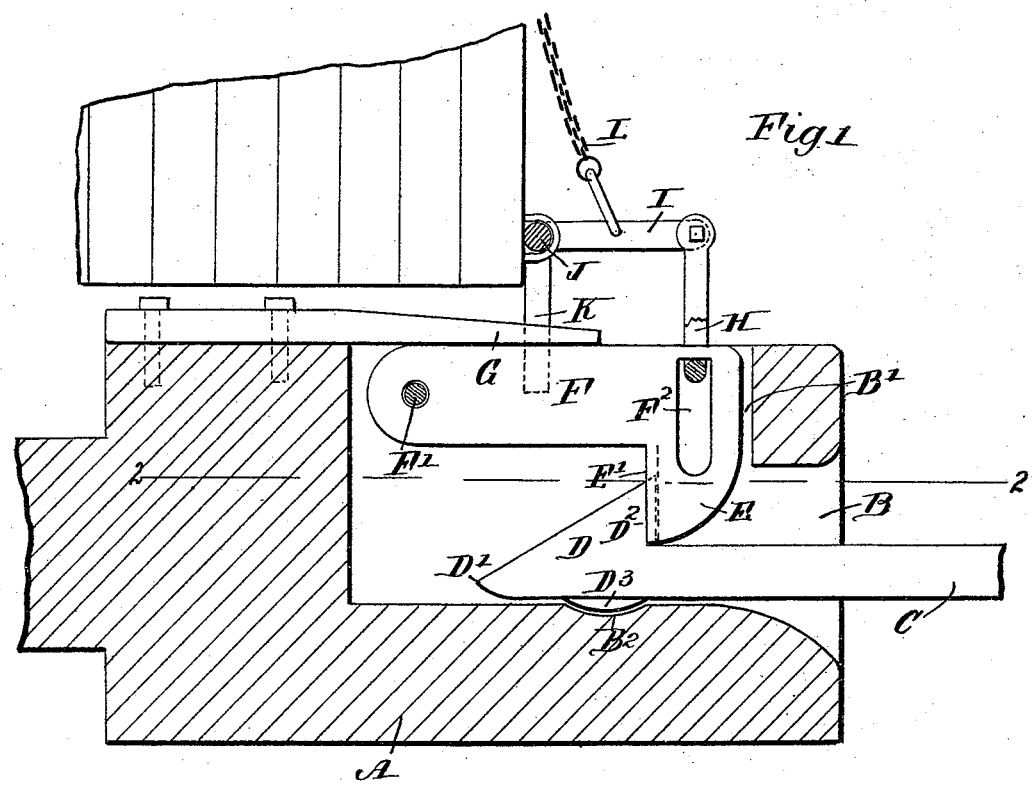
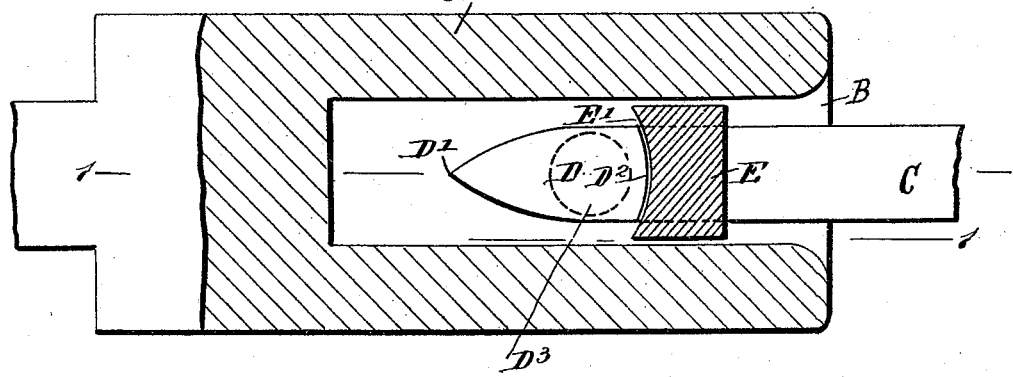
WITNESSES:
F. McArdle
C. Sedgwick
INVENTOR:
H. W. Dennis
BY
Munn & Co.
ATTORNEYS

UNITED STATES PATENT OFFICE.

HENRY W. DENNIS, OF NATICK, MASSACHUSETTS.

CAR-COUPLING.

SPECIFICATION forming part of Letters Patent No. 497,637, dated May 16, 1893.

Application filed August 10, 1892. Serial No. 442,680. (No model.)

*To all whom it may concern:*

Be it known that I, HENRY W. DENNIS, of Natick, in the county of Middlesex and State of Massachusetts, have invented a new and Improved Car-Coupling, of which the following is a full, clear, and exact description.

The object of the invention is to provide a new and improved car coupling, which is simple and durable in construction, very effective in operation, and arranged to securely hold the cars coupled and to permit of automatically coupling the cars and uncoupling the same without stepping between the cars.

The invention consists of certain parts and details and combinations of the same, as will be fully described hereinafter and then pointed out in the claims.

Reference is to be had to the accompanying drawings forming a part of this specification, in which similar letters of reference indicate corresponding parts in both figures.

Figure 1 is a sectional side elevation of the improvement on the line 1—1 of Fig. 2; and Fig. 2 is a sectional plan view of the same on the line 2—2 of Fig. 1.

The drawbar A is provided in its head with the usual opening B, into which passes the coupling link C, provided on each end with a head D preferably made wedge-shaped and pointed, as at D', the back $D^2$ of the wedge-shaped head being convex, to engage a correspondingly shaped concave recess E' formed in the hook E of a dog F pivoted at F' in the head of the drawbar A, the shank of said dog extending longitudinally and its head depending, as is plainly illustrated in Fig. 1. The dog has a free up-and-down swinging motion in a recess B' formed in the top of the drawbar head and leading into the opening B.

On the under side of the head D of the coupling link C is formed a spherical offset $D^3$ engaging a correspondingly shaped recess $B^2$ formed in the bottom of the opening B, so that the said offset and recess make a ball-and-socket joint, to permit the link C to swing horizontally in case the cars travel around curves.

A spring G secured to the top of the drawbar head presses with its free end on the top surface of the dog F, so as to hold the latter in position to prevent its head E from accidentally disengaging the back of the link head D. The dog F can be lifted out of contact with the head D of the coupling link C when it is desired to couple cars, and for this purpose the said dog is provided near its free end with a vertically-arranged slot $F^2$ engaged by a link H pivotally secured on the free end of an arm I projecting from a shaft J, mounted to turn in suitable bearings on the end of the car on which the coupling is applied. The shaft J extends transversely from one side of the car to the other, and is provided on each end with a handle K for conveniently turning said shaft J, so as to swing the arm I upward to cause the link H to raise the dog F out of engagement with the head of the coupling link C. The arm I is also connected with a chain L extending to the top of the car, so that the operator on the foot-board of the car, by pulling on the chain L, can impart an upward swinging motion to the arm I to lift the dog F out of contact with the head D of the coupling link.

It will be seen that when the dog F is in its normal position, as shown in Fig. 1, the link H is in contact with the upper end of the slot $F^2$, so that the dog F is normally held in this position, but can freely swing upward when pressed on at its head E by the entering head D of the coupling link C. The front edge or bottom of the head E is preferably rounded so that the top, inclined surface of the entering head D readily engages the head and tips the same upward against the tension of the spring G and without disturbing the lifting device until the back $D^2$ of the said head has passed the convex recess E' of the head E. The latter then is forced downward into the position shown in Fig. 1 by the action of the spring G, partly by its own weight.

It will be seen that this device is very simple and durable in construction, and permits the dog F to swing upward without disturbing the lifting device, which latter is only used in uncoupling cars.

It will further be seen that the coupled cars can readily pass around curves without any friction on the car coupling, as the link C has the ball-and-socket connection at each end with the respective head of the drawbar.

Having thus fully described my invention, I claim as new and desire to secure by Letters Patent—

1. In a car coupling, the combination with a draw head, of a dog pivoted in the draw head and provided with a vertical slot, a shaft mounted on the end of the car and provided with a projecting arm, and a link secured to the said arm and engaging the slot of the dog, substantially as described.

2. In a car coupling, the combination with a drawbar formed in its head with an opening having a spherical recess in its bottom, of a coupling link provided with a head formed at its under side with a segmental offset engaging the said recess, so as to form a ball-and-socket joint between the drawbar and the link, substantially as shown and described.

3. In a car coupling, the combination with a dog adapted to be pivoted in the drawbar and having a depending head formed on its back with a concave recess, of a coupling link having a wedge-shaped head formed on its back with a convex offset fitting into the recess in the back of the dog head, a spring pressing on the said dog to hold the latter in engagement with the said link head, and a lifting device, substantially as shown and described, for lifting the said dog out of its normal position to uncouple the dog and link, the said lifting device not being affected by the lifting of the dog during the act of coupling, as set forth.

HENRY W. DENNIS.

Witnesses:
EDWARD A. ADAMS,
RICHARD A. CLUIT.